United States Patent [19]

Obi

[11] Patent Number: 4,607,321

[45] Date of Patent: Aug. 19, 1986

[54] INVERTER

[75] Inventor: Hideo Obi, Hyogo, Japan

[73] Assignee: Mitsubishi Denki Kabushiki Kaisha, Tokyo, Japan

[21] Appl. No.: 787,716

[22] Filed: Oct. 17, 1985

Related U.S. Application Data

[63] Continuation of Ser. No. 484,674, Apr. 13, 1983, abandoned.

[30] Foreign Application Priority Data

Apr. 13, 1982 [JP] Japan ................................. 57-63027

[51] Int. Cl.[4] ............................................. H02M 1/12
[52] U.S. Cl. ...................................... 363/41; 363/95; 318/811
[58] Field of Search ............................. 363/41, 95–98, 363/131–138; 318/801, 802, 811, 812

Primary Examiner—Peter S. Wong
Attorney, Agent, or Firm—Sughrue, Mion, Zinn, Macpeak & Seas

[57] ABSTRACT

An inverter for use with a vehicular induction motor employs a modulation system in which the waveform of the carrier wave is adjusted so that the modulation wave is made into a constant DC signal.

1 Claim, 5 Drawing Figures

INVERTER

This is a continuation, of application Ser. No. 484,674, filed 4/13/83, now abandoned.

BACKGROUND OF THE INVENTION

This invention relates to a variable voltage and variable frequency high frequency pulse width modulation inverter (hereinafter referred to merely as a VVVF inverter) for controlling the speed of a vehicle driving induction motor (hereinafter referred to merely as an IM).

In driving an electric vehicle by controlling the IM with the VVVF inverter, a predetermined slip frequency control operation is carried out under the following conditions:

During powering, $$fINV = fR + fS \quad (1)$$

During regeneration, $$fINV = fR - fS \quad (2)$$

where fINV is the output frequency of the VVVF inverter, i.e., the frequency of the revolving magnetic field of the IM, fR is the rotation frequency of the IM, and fS is the slip frequency. At the same time, the output voltage V of the VVVF inverter is controlled such that the ratio (V/fINV) of the output voltage V to the output frequency fINV is constant, whereby the IM output torque T is made constant. In the range where fS/fINV is small, the output torque T can be represented by the following expression:

$$T = k \cdot V/fINV \cdot fS \quad (3)$$

Thus, if fS and V/fINV are made constant in the range where fS/fINV is small, the output torque T can be made constant according to expression (3).

FIG. 1 shows one example of the main circuit for the VVVF inverter and the IM. In FIG. 1, reference numeral 1 designates a DC source; 2, a circuit breaker; 3, a filter reactor; 4, a filter capacitor; 5, the VVVF inverter; 6, the IM; and 7, a frequency sensor for detecting the rotary frequency fR of the IM 6.

In accelerating the IM 6 in FIG. 1, as the rotary frequency fR is increased, the output frequency fINV of the VVVF inverter is increased according to the expression (1), and the inverter output voltage V is increased proportionally.

One example of a method of adjusting the output voltage V and the output frequency of the inverter is as shown in FIG. 2.

In FIG. 2, switching is generally carried out so that, when the output voltage is low and the output frequency fINV is low, the number N of high frequency pulses occurring in a half cycle of the inverter output AC waveform is decreased as the output frequency fINV of the output voltage V is increased. This is because the switching speed of an output voltage control element such as a thyristor forming the VVVF inverter is limited, and it is impossible to provide a very high modulation frequency (N×fINV).

FIG. 3 shows one example of a conventional 9-pulse mode modulation system in which the number of pulses N=9. More specifically, shown in FIG. 3 is a sine wave modulation system in which small harmonic components are included in the output voltage waveform. In FIG. 3, reference numeral 8 designates a triangular carrier wave; 9, a sine-wave U-phase modulation wave; 10, a U-phase modulation signal which is provided by subjecting the carrier wave 8 and the U-phase modulation wave 9 to comparison; and 11, a V-phase modulation signal which is obtained by comparing the carrier wave 8 and a V-phase modulation wave (not shown) which lags the U-phase modulation signal by 120° in phase.

When the U-phase modulation signal 10 is applied as an on-off signal to the U-phase output voltage control element in the inverter 5 in FIG. 1, and the V-phase modulation signal 11 is applied to the V-phase output voltage control element, a U-V phase output voltage waveform 12 of the VVVF inverter is obtained as shown in FIG. 3.

In FIG. 3, as the height of the U-phase modulation wave 9 is increased, the slots in the output voltage waveform 12 are decreased, so that the magnitude of the VVVF inverter output voltage V can be adjusted. The inverter output frequency fINV can be adjusted by changing the frequencies of the carrier wave 8 and the U-phase modulation wave 9.

FIG. 4 is a waveform diagram showing the content factor kn of the fundamental wave which is an effective component among the respective output waveforms for the cases where the pulse members are 9, 5 and 3, respectively. More specifically, FIG. 4 shows the content factor kn of the fundamental wave in the VVVF inverter output voltage V. In FIG. 4, for the case where the pulse number is 3, the content factor kn at the maximum voltage of the output V is determined as 1. Different pulse numbers provide different content factors kn with respect to the height A of the modulation wave 9. Accordingly, if the same height A is maintained when the pulse number is switched, the output voltage V is varied, as a result of which an overvoltage is applied to the IM 6 and an overcurrent flows therein. Accordingly, whenever the number of pulses is changed, the height A is switched as indicated in FIG. 2.

SUMMARY OF THE INVENTION

An object of this invention is to eliminate the above-described difficulty. More specifically, an object of this invention is to provide an inverter which employs a modulation system in which the waveform of the carrier wave is adjusted so that the modulation wave is made into a constant DC signal, and in which it is unnecessary to change the height A whenever the pulse number is changed.

DETAILED DESCRIPTION OF THE PREFERRED EMBODIMENTS

Figure 5:
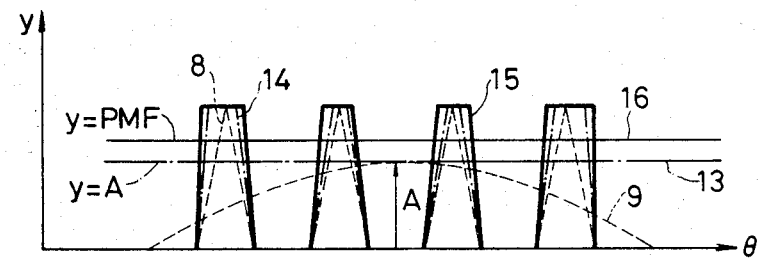
FIG. 5 is an explanatory diagram describing one embodiment of this invention.

This invention will now be described with reference to the accompanying drawings. FIG. 5 shows the case where the pulse number N=9. In FIG. 5, the conventional sine wave modulation system is indicated by the broken lines. The intersections of the triangular waves and the sine wave can be obtained by solving the following simultaneous equations (4) and (5): FIG. 5 shows the range from 0° to 180° for simplification in description; however, the range from 180° to 360° can be obtained by inverting the modulation signal.

Triangular wave (8):

$$y = (-1)^{m-1} \cdot \frac{N}{90} \theta + 2(-1)^m \cdot m \quad (4)$$

Sine wave (9):

$$y = A \cdot \sin \theta \quad (5)$$

where $A = kn \cdot PMF > 0$ and
 $Kn$ = content factor of the fundamental wave with the pulse number being n;
 PMF = Modulation factor;
 m = an integer from 1 to n−1;
 N = the number of pulses; and
 $\theta$ = the angle.
In FIG. 5, N=9 and kn=k9.
From equations (4) and (5), $$A = \left\{ (-1)^{m-1} \cdot \frac{N}{90} \theta + 2 \cdot (-1)^m \cdot m \right\} / \sin \theta \quad (6)$$

Therefore,
Straight line (13):

$$y = A \quad (7)$$

Approximate trapezoid wave (14), or first carrier wave:

$$y = \left\{ (-1)^{m-1} \cdot \frac{N}{90} \theta + 2 \cdot (-1)^m \cdot m \right\} / \sin \theta \quad (8)$$

Solving simultaneous equations (7) and (8) provides the same $\theta$ as is obtained when equations (4) and (5) are solved.

Figure 1:
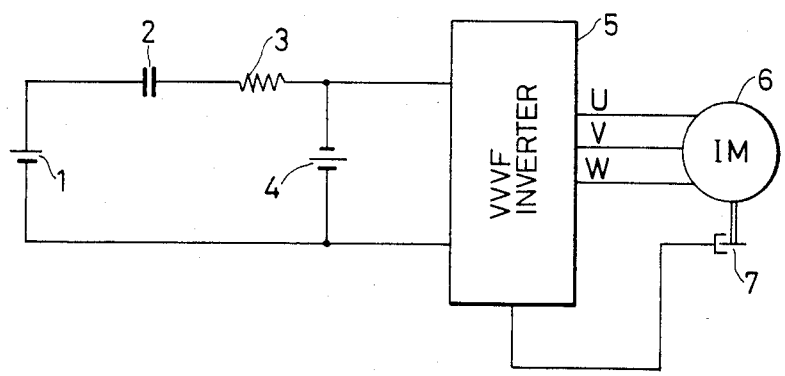
FIG. 1 is a circuit diagram showing the main circuit for an IM and a VVVF inverter therefor.
Figure 2:
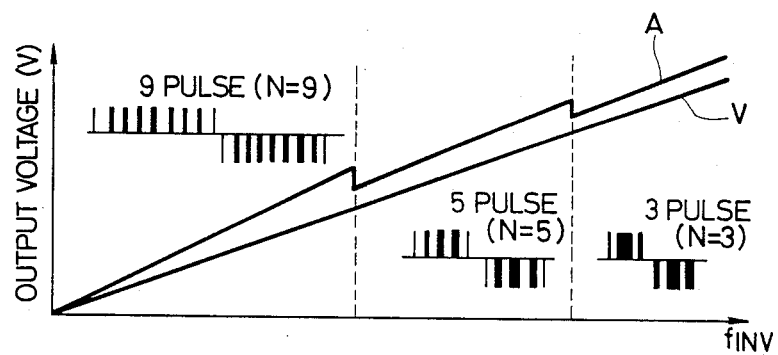
FIG. 2 is a graphical representation describing the relationship between an output voltage V and an output frequency fINV.
Figure 3:
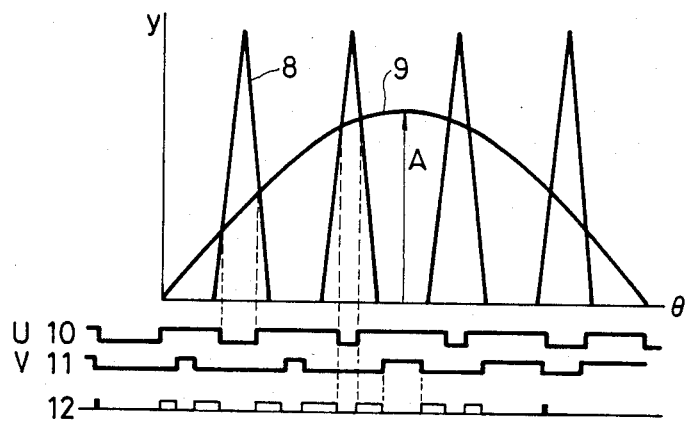
FIG. 3 is an explanatory diagram describing a conventional modulation system.
Figure 4:
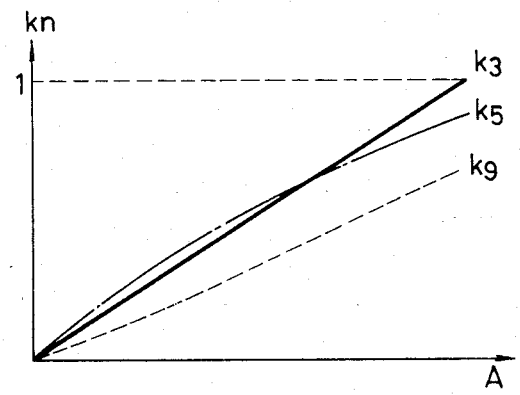
FIG. 4 is an explanatory diagram indicating fundamental wave content factors kn separately according to the pulse number.

As is clear from FIG. 4, the modulation factor PMF is defined by the height A and the fundamental wave content factor k9.

$$PMF = A/k_9 \quad (9)$$

If the angle $\theta$ is obtained from the above-described data, there it will be understood that the modulation factor PMF at the angle $\theta$ where the sine wave 9 intersects the triangular wave 8 is finitely determined.

From equations (6) and (9), a corrected second carrier wave is obtained by dividing the first carrier wave of equation (8) by the fundamental wave content factor, e.g., $$PMF = \left\{ (-1)^{m-1} \cdot \frac{N}{90} \theta + 2 \cdot (-1)^m \cdot m \right\} / k_9 \sin \theta \quad (10)$$

The results of calculations of modulation factors PMF with respect to all angles $\theta$ according to equation (10) are as indiated by the solid lines in FIG. 5; that is, a trapezoidal carrier wave 15 is obtained.

In the case where the pulse number N is five, k9 in equation (10) should be replaced by k5. The same can be said for the case where N=3.

Thus, the modulation factor PMF 16 is constant as shown in FIG. 5. Therefore, it is unnecessary to change the height whenever the number of pulses is switched, and the waveforms to be subjected to comparison are very simple. Accordingly, the circuit can be greatly simplified and miniaturized, and the modulation circuit can be improved in reliability and reduced in manufacturing cost.

What is claimed is:
1. A high frequency pulse width modulation inverter for generating an inverter output AC waveform having high frequency pulses, characterized in that a first carrier wave (14) for determining the frequency of said high frequency pulses is divided by a fundamental wave content factor of an output voltage to obtain a second carrier wave (15), said factor being unequivocally determined by the number of pulses occurring in a half cycle of said output of said inverter and the modulation rate of the output voltage, and said second carrier wave is compared with a modulation wave of a constant DC voltage corresponding to the modulation rate to generate a gate signal for an output voltage control element.

* * * * *